(12) United States Patent
Morris et al.

(10) Patent No.: US 7,913,342 B1
(45) Date of Patent: Mar. 29, 2011

(54) COUNTERBALANCE MECHANISM FOR FOLD OUT RAMP

(75) Inventors: Donald Morris, Conifer, CO (US); Alan Cohn, Lockeford, CA (US)

(73) Assignee: Lift-U, a division of Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 12/754,456

(22) Filed: Apr. 5, 2010

Related U.S. Application Data

(60) Provisional application No. 61/252,519, filed on Oct. 16, 2009.

(51) Int. Cl.
*E01D 1/00* (2006.01)
(52) U.S. Cl. .......................................... 14/71.3; 14/71.1
(58) Field of Classification Search .............. 74/53, 567, 74/569, 603; 14/71.1, 71.3
See application file for complete search history.

(56) References Cited

U.S. PATENT DOCUMENTS

| | | | |
|---|---|---|---|
| 2,547,532 A * | 4/1951 | Mendelsohn | ............ 248/292.11 |
| 4,081,091 A | 3/1978 | Thorley | |
| 4,274,172 A | 6/1981 | Franklin | |
| 4,365,374 A | 12/1982 | Bennett | |
| 4,499,970 A | 2/1985 | Hussey | |
| 4,503,722 A | 3/1985 | Suzuki | |
| 4,525,887 A | 7/1985 | Erlandsson | |
| 4,550,623 A | 11/1985 | Gysling | |
| 4,571,775 A | 2/1986 | Leonard | |
| 4,621,391 A | 11/1986 | Leonard | |
| 4,627,784 A | 12/1986 | Collins | |
| 4,657,233 A | 4/1987 | Vroom | |
| 4,665,579 A | 5/1987 | Bennett | |
| 4,691,956 A | 9/1987 | Hodge | |
| 4,797,042 A | 1/1989 | McFarland | |
| 4,836,736 A | 6/1989 | Neagu | |
| 4,873,791 A | 10/1989 | Lyons, Sr. | |
| 4,907,936 A | 3/1990 | Bourdage | |
| 4,950,124 A | 8/1990 | Burghart | |
| 5,040,936 A | 8/1991 | Rhea | |
| 5,085,555 A | 2/1992 | Vartanian | |

(Continued)

FOREIGN PATENT DOCUMENTS

DE 4413444 A1 10/1995

(Continued)

OTHER PUBLICATIONS

"Mechanical Dock Levelers," K&K Material Handling, n.d., <http://www.knkmaterialhandling.com/Dock/Frame_DockProducts.htm> [retrieved Jul. 16, 2009], 7 pages.

(Continued)

*Primary Examiner* — Gary S Hartmann
(74) *Attorney, Agent, or Firm* — Christensen O'Connor Johnson Kindness PLLC

(57) ABSTRACT

A ramp assembly has a ramp portion configured for reciprocating motion between a stowed position, a deployed position, and a neutral position. A counterbalance is associated with the ramp portion and includes a drive element with a spring fitting. The drive element is rotatably coupled about a first axis of rotation that moves along an arcuate path. A restraint is slidably coupled to the drive element and is also rotatably coupled about a fixed axis of rotation. An end stop is associated with the restraint. A compression spring is disposed between the spring fitting and a portion of the restraint so that the compression spring provides a force to bias the ramp portion toward the neutral position.

10 Claims, 11 Drawing Sheets

U.S. PATENT DOCUMENTS

| | | | |
|---|---|---|---|
| 5,111,912 A * | 5/1992 | Kempf | 187/250 |
| 5,145,310 A | 9/1992 | Calzone | |
| 5,224,722 A | 7/1993 | Kempf | |
| 5,253,410 A | 10/1993 | Mortenson | |
| 5,306,113 A | 4/1994 | Mann | |
| 5,316,432 A | 5/1994 | Smalley | |
| 5,358,301 A | 10/1994 | Konchan | |
| 5,375,962 A | 12/1994 | Kempf | |
| 5,391,041 A | 2/1995 | Stanbury | |
| 5,392,481 A | 2/1995 | Hageman | |
| 5,449,267 A | 9/1995 | Ablabutyan | |
| 5,865,593 A | 2/1999 | Cohn | |
| 5,871,329 A * | 2/1999 | Tidrick et al. | 414/537 |
| 5,988,724 A | 11/1999 | Wolda | |
| 6,010,298 A | 1/2000 | Cohn | |
| 6,112,353 A | 9/2000 | Winter | |
| 6,125,491 A | 10/2000 | Alexander | |
| 6,196,609 B1 | 3/2001 | Bowers | |
| 6,203,265 B1 | 3/2001 | Cohn | |
| 6,210,098 B1 | 4/2001 | Cohn | |
| 6,238,168 B1 | 5/2001 | Cohn | |
| 6,409,458 B1 | 6/2002 | Cohn | |
| 6,602,041 B2 | 8/2003 | Lewis | |
| 6,698,998 B2 | 3/2004 | Koretsky | |
| 6,718,886 B2 | 4/2004 | Engle | |
| 6,769,149 B2 | 8/2004 | Alexander | |
| 6,843,635 B2 | 1/2005 | Cohn | |
| 6,964,445 B1 | 11/2005 | Bellis, Jr. | |
| 6,988,289 B2 | 1/2006 | Pedersen | |
| 7,029,050 B1 | 4/2006 | Johnson | |
| 7,156,441 B2 | 1/2007 | Austin | |
| 7,228,582 B1 | 6/2007 | Jones | |
| 7,264,433 B2 | 9/2007 | Navarro | |
| 7,353,558 B2 | 4/2008 | Alexander et al. | |
| 7,500,818 B1 | 3/2009 | Johnson | |
| 2002/0197141 A1 | 12/2002 | Cohn | |
| 2004/0096304 A1 | 5/2004 | Lewis | |
| 2004/0136820 A1 | 7/2004 | Cohn | |
| 2008/0006105 A1 | 1/2008 | Ko | |
| 2008/0271268 A1 | 11/2008 | Johnson | |
| 2008/0273956 A1 | 11/2008 | Morris | |

FOREIGN PATENT DOCUMENTS

| | | |
|---|---|---|
| DE | 297 07 803 U1 | 10/1997 |
| DE | 102004048761 A1 | 4/2006 |
| EP | 0875421 A1 | 11/1998 |
| EP | 1844980 A2 | 10/2007 |
| GB | 585917 | 2/1947 |
| GB | 2 116 940 A | 10/1983 |
| GB | 2 274 092 A | 7/1994 |
| GB | 2306152 A | 4/1997 |
| GB | 2369344 A | 5/2002 |
| JP | 07-108867 | 5/1994 |
| JP | 2001-239888 | 9/2001 |
| JP | 2008-230270 | 10/2008 |
| WO | 0147746 A1 | 7/2001 |

OTHER PUBLICATIONS

Fall Protection Systems, Inc., <http://www.fallprotectionsystems.com/access_systems.html> [retrieved Jul. 14, 2009].

* cited by examiner

COUNTERBALANCE MECHANISM FOR FOLD OUT RAMP

BACKGROUND

The Americans with Disabilities Act (ADA) requires the removal of physical obstacles to those who are physically challenged. The stated objective of this legislation has increased public awareness and concern over the requirements of the physically challenged. Consequentially, there has been more emphasis on providing systems that assist such people to access a motor vehicle, such as a bus or minivan.

A common manner of providing the physically challenged with access to motor vehicles is a ramp. Various ramp operating systems for motor vehicles are known in the art. Some slide out from underneath the floor of the vehicle and tilt down. Others are stowed in a vertical position and are pivoted about a hinge, while still others are supported by booms and cable assemblies. The present invention is generally directed to a "fold out" type of ramp. Such a ramp is normally stowed in a horizontal position within a recess in the vehicle floor, and is pivoted upward and outward to a downward-sloping extended position. In the extended position, the ramp is adjustable to varying curb heights.

Fold out ramps on vehicles confront a variety of technical problems. Longer ramps are desirable because the resulting slope is more gradual and more accessible by wheelchair-bound passengers. Longer ramps are, however, heavier and require more torque about the hinge to be reciprocated between deployed and stowed positions. To satisfy this torque requirement, such fold-out ramps use large electric motors, pneumatic devices, or hydraulic actuators to deploy and stow the ramp. Many of such systems cannot be moved manually in the event of failure of the power source unless the drive mechanism is first disengaged. Some existing fold-out ramps can be deployed or stowed manually, but they are difficult to operate because one must first overcome the resistance of the drive mechanism.

As noted above, many existing fold-out ramps are equipped with hydraulic, electric, or pneumatic actuating devices. Such devices are obtrusive and make access to and from a vehicle difficult when the ramp is stowed. Moreover, many of such fold-out ramps have no energy storage capabilities to aid the lifting of the ramp, and thereby preserve the life of the drive motor or even allow a smaller drive to be employed. Finally, operating systems for such fold-out ramps must have large power sources to overcome the torque placed on the hinge by the necessarily long moment arm of the fold-out ramp.

SUMMARY

A ramp assembly has a ramp portion configured for reciprocating motion between a stowed position, a deployed position, and a neutral position. A counterbalance assembly is associated with the ramp portion and includes a drive element rotatably coupled about a first axis of rotation, wherein the first axis of rotation moves along an arcuate path when the ramp portion reciprocates between the stowed position and the deployed position. A spring fitting is associated with the drive element. The counterbalance assembly further includes a restraint that is slidably coupled to the drive element and is coupled for rotational movement about a second axis of rotation, wherein the second axis of rotation has a fixed location. A compression spring is disposed between the spring fitting and a portion of the restraint so that the compression spring provides a force to bias the ramp portion toward the stowed position when the ramp portion is between the deployed position and the neutral position, and toward the deployed position when the ramp portion is between the stowed position and the neutral position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Exemplary embodiments of the present invention will now be described with reference to the accompanying drawings where like numerals correspond to like elements. The disclosed embodiments are directed to ramp assemblies, and specifically, to wheelchair ramp assemblies. In particular, described embodiments are directed to wheelchair ramp assemblies suitable for use in buses, vans, etc.

The following discussion proceeds with reference to examples of wheelchair ramp assemblies for use in vehicles having a floor, such as a bus, van, etc. While the examples provided herein have been described with reference to their association with vehicles, it will be apparent to one skilled in the art that this is done for illustrative purposes and should not be construed as limiting the scope of the claimed subject matter. Thus, it will be apparent to one skilled in the art that aspects of the present disclosure may be employed with other ramp assemblies used in stationary installations, such as residential buildings and the like.

The following detailed description may use illustrative terms such as vertical, horizontal, front, rear, curbside, roadside, inboard, outboard, proximal, distal, etc. However, these terms are descriptive in nature and should not be construed as limiting. Further, it will be appreciated that embodiments of the present disclosure may employ any combination of features described herein.

Figure 1:
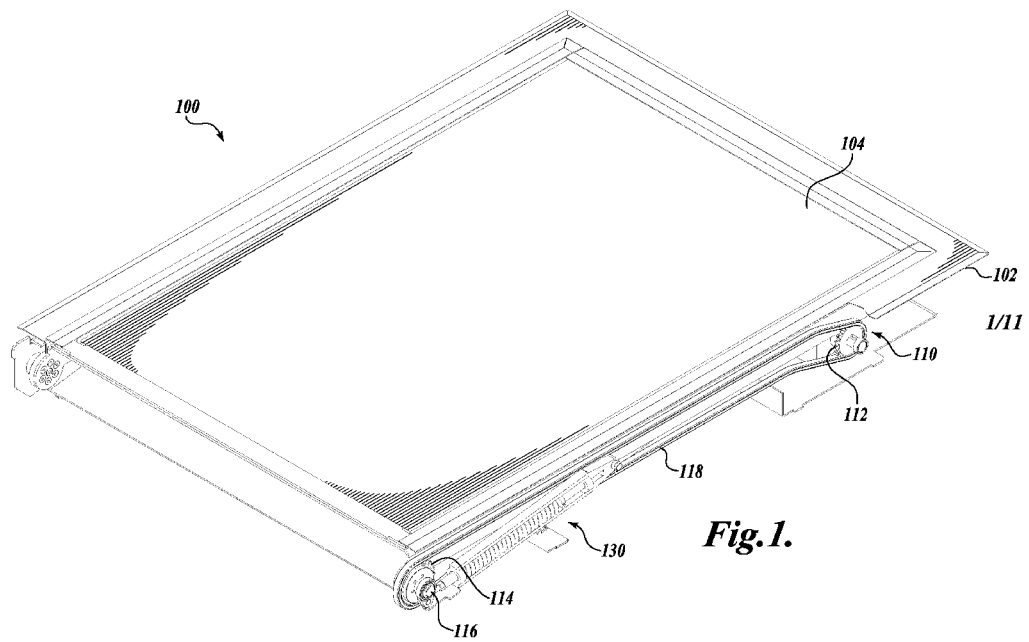
FIG. 1 shows an isometric view of a fold out ramp having a counterbalance mechanism, wherein a ramp portion is shown in the stowed position.
Figure 2:
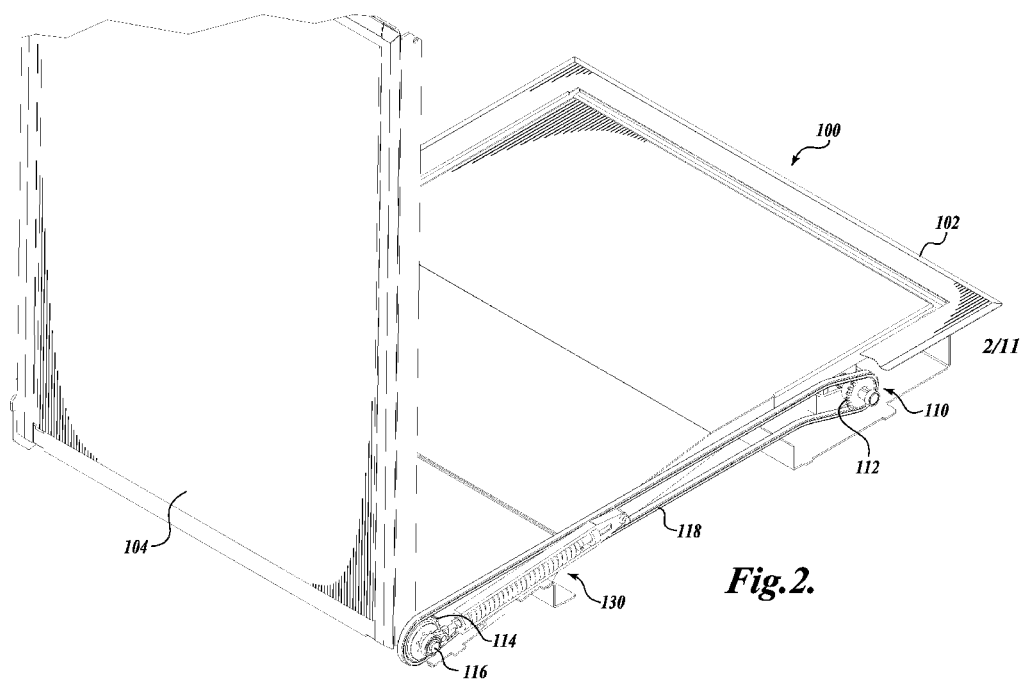
FIG. 2 shows an isometric view of the fold out ramp of FIG. 1, with the ramp portion located between the stowed position and a deployed position.
Figure 3:
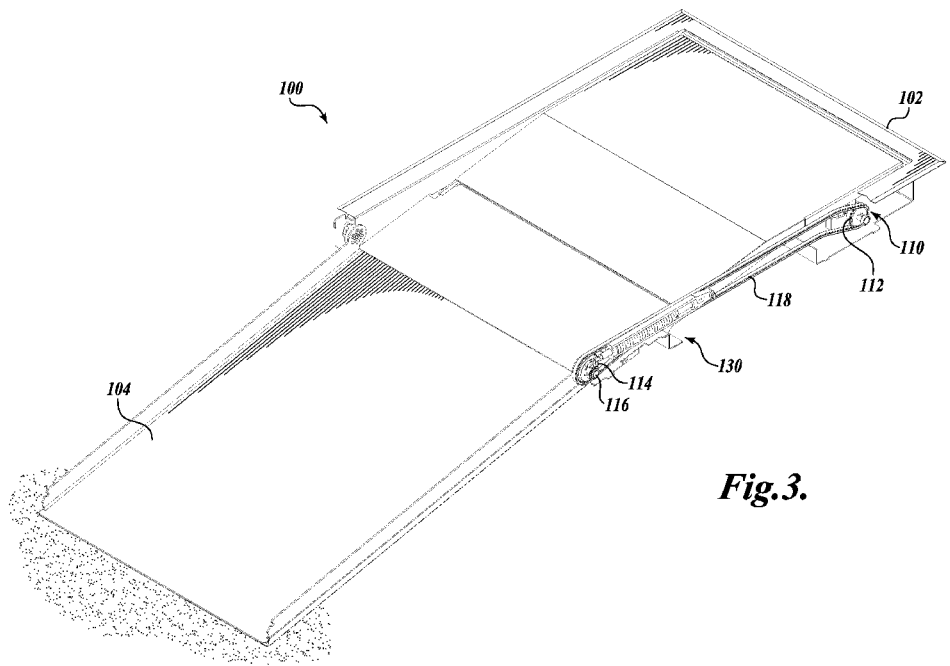
FIG. 3 shows an isometric view of the fold out ramp of FIG. 1, with the ramp portion in a deployed position.

FIGS. 1-3 illustrate an exemplary embodiment of a fold out ramp assembly 100 (hereinafter the "ramp assembly 100") suitable for use with the described counterbalance assemblies. The ramp assembly 100 is adapted to be mounted to a vehicle (not shown), such as a bus or a van and includes a ramp portion 104. The ramp portion 104 is mounted to be rotatable about one end so that the ramp portion 104 is reciprocal between the stowed position, as shown in FIG. 1, and a deployed position, as shown in FIG. 3.

When a ramp assembly is installed in a vehicle, some components of the ramp assembly 100 may maintain a fixed relationship relative to the vehicle structure, while other components move relative to the vehicle structure when the ramp reciprocates between a stowed position and a deployed position. Similarly, when a ramp assembly is installed in a stationary installation, such as a residential building and the like, some components of the ramp assembly may maintain a fixed relationship relative to the building structure, while other components move relative to the building structure when the ramp reciprocates between a stowed position and a deployed position. As illustrated, the ramp assembly of FIGS. 1-3 includes a fixed portion 102. For such embodiments, the fixed portion 102 of the ramp assembly 100 maintains a fixed relationship to the vehicle or other structure to which the ramp assembly is mounted. It will also be appreciated that the fixed portion of the ramp assembly also maintains a fixed relationship to any defined ramp position. That is, the fixed portion 102 of the ramp assembly 100 can be described as having a fixed relationship to the stowed position of the ramp portion, i.e., to the ramp portion when the ramp portion is in the stowed position. Similarly, the fixed portion of the ramp assembly can be described as having a fixed relationship to the neutral position of the ramp portion, which is the position in which the center of gravity of the ramp portion 104 is positioned so that the weight of the ramp portion does not impart a moment on the ramp portion. Alternate embodiments that do not include a fixed portion are also possible. For such embodiments, the ramp portion is rotatably coupled directly to a portion of the vehicle or other structure to which the ramp assembly is mounted.

Movement of the ramp portion 104 is powered by a motor (not shown), which is operatively coupled to the ramp portion with a transmission assembly 110. The transmission assembly includes a roadside sprocket 112 operatively coupled to the drive shaft of the motor and located toward the roadside portion of the ramp assembly 100. A curbside sprocket 114 is positioned along the curbside end of the ramp assembly. In the illustrated embodiment, the curbside sprocket 114 is fixedly coupled to an output shaft 116. The output shaft 116 is operatively coupled to the ramp portion so that rotation of the output shaft 116 in a first direction actuates the ramp portion towards the stowed position, and rotation of the output shaft in a second direction actuates the ramp portion towards a deployed position. A chain 118 forms an endless loop that engages the curbside sprocket 114 and the roadside sprocket 112 so that rotation of the roadside sprocket rotates the output shaft 116, thus actuating the ramp portion.

The illustrated transmission assembly is exemplary only and should not be considered limiting. For example, although the transmission assembly 110 is described as a combination of sprockets 112 and 114 and a chain 118, other known transmission assemblies may be utilized, including but not limited to a plurality of gears, a belt and pulleys, etc. It is also anticipated that the drive shaft of the motor can be directly coupled to the ramp portion provide an actuating force to the ramp portion. It will be apparent to one of ordinary skill the art that these and other variations to the transmission assembly are possible. Accordingly, such alternate embodiments should be considered within the scope of the present disclosure.

In the illustrated embodiment, the output shaft 116 serves as a pivot axis for the ramp portion 104 to which the curbside sprocket 114 is attached. That is, the axis of rotation of the output shaft 116 is coincident to the center of rotation of the ramp portion 104 as the ramp portion reciprocates between the stowed position and a deployed position. It should be appreciated that the output shaft 116 need not be so located. One of ordinary skill in the art would recognize that the location and orientation of the output shaft 116 can differ with the inclusion of various known transmission elements to couple the output shaft 116 to the ramp portion 104. Also envisioned are embodiments wherein the driveshaft that couples the motor to the roadside sprocket 112 acts as an output shaft 116, i.e., the shaft to which the counterbalance 130 is attached. Such a configuration would allow the counterbalance assembly to be located internal to the ramp assembly 100, i.e. under the ramp portion 104 when the ramp portion is in the stowed position. It should be appreciated that the output shaft 116 can be any shaft associated with the ramp assembly 100 that rotates in a first direction when the ramp portion 104 moves toward the stowed position and in a second direction when the ramp portion moves toward a deployed position.

Figure 5:
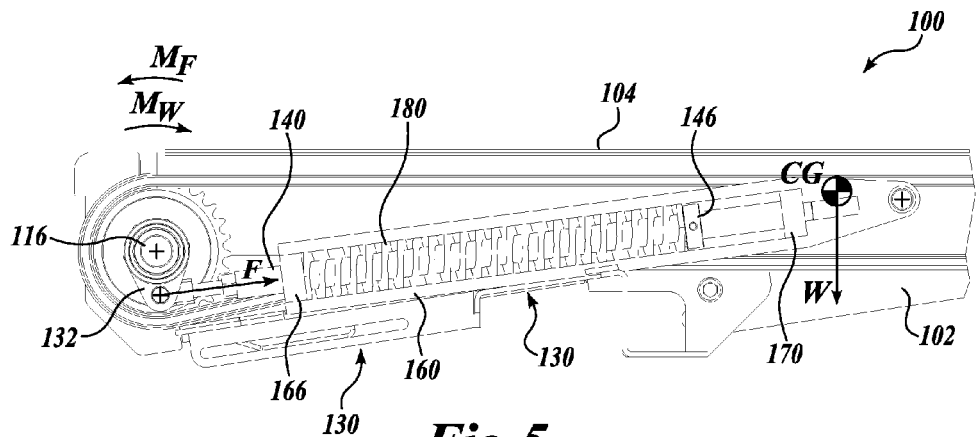
FIG. 5 shows a side view of the counterbalance assembly of FIG. 4, with the ramp portion in the stowed position.
Figure 6:
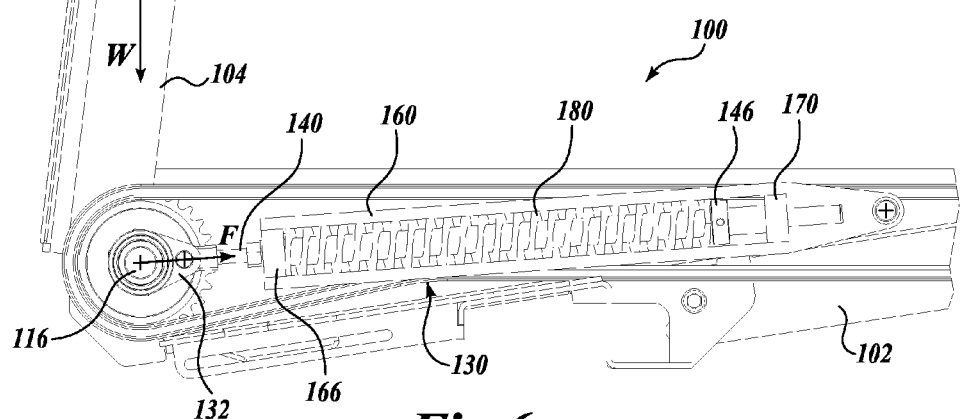
FIG. 6 shows a side view of the counterbalance assembly of FIG. 4, with the ramp portion in the neutral position.
Figure 7:
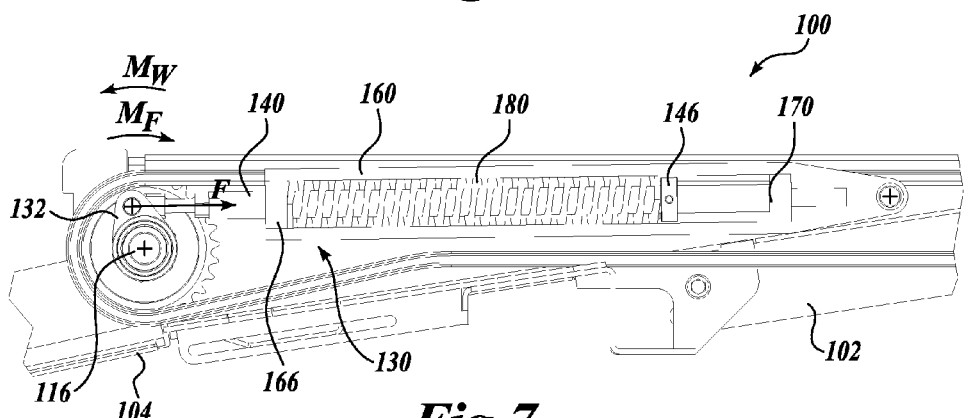
FIG. 7 shows a side view of the counterbalance assembly of FIG. 4, with the ramp portion in a deployed position.

FIGS. 5-7 show the ramp assembly 100 as the ramp portion 104 rotates from the stowed position (FIG. 5) through the neutral position (FIG. 6) to a deployed position (FIG. 7). Referring to FIG. 5, when the ramp is in the stowed position, the weight of the ramp portion 104, which is idealized as a force W acting at the CG, is positioned roadside of the center of rotation of the ramp portion 104 and imparts a moment $M_W$ on the ramp portion 104 that tends to rotate the ramp portion away from the neutral position and toward the stowed position. Similarly, when the ramp portion 104 is in a deployed position, as shown in FIG. 7, the weight W of the ramp portion imparts a moment $M_W$ on the ramp portion that tends to rotate the ramp portion away from the neutral position and toward the deployed position. The moment $M_W$ is the product of the weight W of the ramp portion 104 multiplied by moment arm $d_W$, which is the horizontal distance between the center of rotation and the CG of the ramp portion 104. As the ramp portion 104 moves from either the stowed position or a deployed position toward the neutral position, the moment arm $d_W$ decreases according to the cosine of the angle of the ramp portion relative to a horizontal plane. As a result, the moment $M_W$ also decreases according to the cosine of the angle of the ramp portion relative to a horizontal plane as the ramp portion 104 moves toward the neutral position.

As shown in FIG. 6, when the ramp portion 104 is in the neutral position, the CG of the ramp portion 104 is located directly over the center of rotation of the ramp portion 104, i.e., $d_W=0$. As a result, the weight W of the ramp portion 104 does not impart any moment about the center of rotation of the ramp portion 104. In the illustrated embodiment, the neutral position is depicted as occurring when the ramp is in a substantially vertical position. It should be appreciated, however, that the position of the CG can vary according to the configuration of the ramp portion 104. Accordingly, the neutral position, i.e. the position at which the CG is located above the center of rotation of the ramp portion 104, can also vary according to the configuration of the ramp portion 104.

Figure 4:
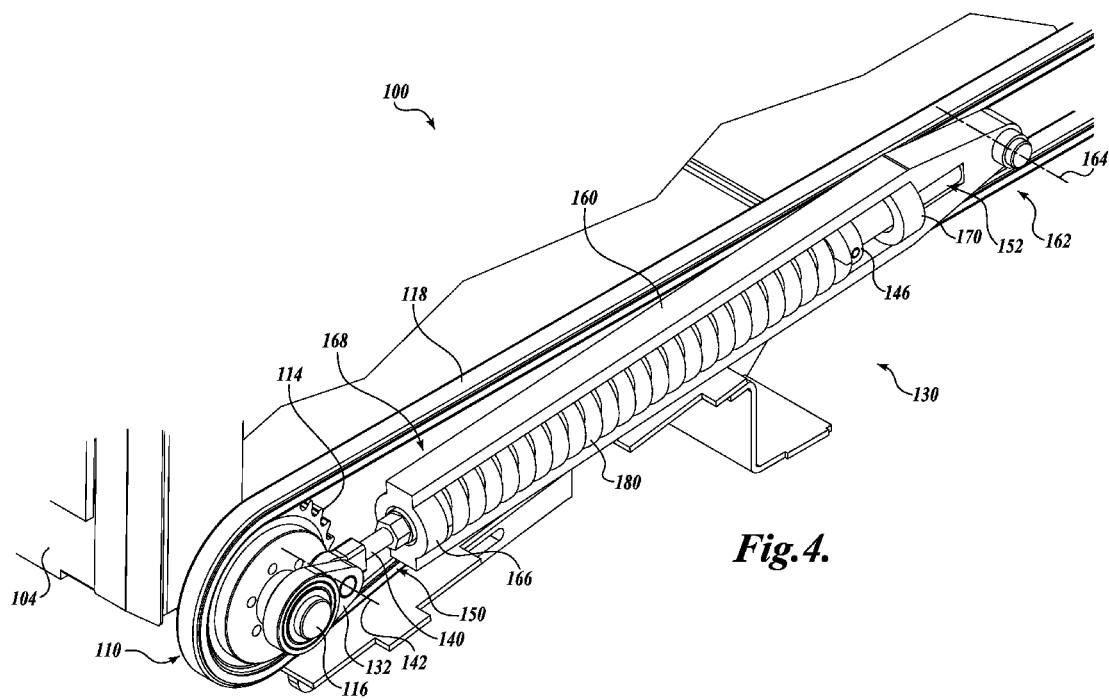
FIG. 4 shows an isometric view of a first exemplary embodiment of the counterbalance assembly of FIG. 1.

Referring now to FIGS. 4-7, a first exemplary embodiment of a counterbalance assembly 130 is shown. As best shown in FIG. 4, the counterbalance assembly 130 includes a crank 132 coupled to the output shaft 116 so that the crank rotates in a first direction when the ramp portion 104 moves toward the stowed position and in a second direction when the ramp portion 104 moves toward a deployed position. While the output shaft 116 of the illustrated embodiment is part of the transmission assembly 110, alternate embodiments are contemplated wherein the output shaft is separate from the transmission assembly. In this regard, the output shaft 116 can be any shaft configured to rotate in a first direction when the ramp portion 104 moves toward the stowed position, and in a second direction when the ramp portion moves toward the deployed position.

A drive element 140 is rotatably coupled at a proximal end 150 end to the crank 132 about an axis of rotation 142. Movement of the ramp portion 104 between the stowed position and a deployed position rotates the output shaft 116, and thus the crank 132, so that the axis of rotation 142 moves along an arcuate path. In the illustrated embodiment, the drive element 140 is an elongate rod, however, the drive element 140 can take any number of various forms and configurations without departing from the scope of the present disclosure.

A spring fitting 146 is associated with the drive element 140 and moves with the drive element as the ramp reciprocates between the stowed position and a deployed position. As shown in FIG. 4, the spring fitting 146 is a disc coupled to the rod. One of skill in the art will appreciate that the spring fitting need not be a disc, but can instead take any of a number of suitable forms. Further, while the spring fitting 146 is illustrated to be a separate piece coupled to the drive element 140, the spring fitting can instead be integrally formed with the drive element.

Still referring to FIG. 4, a restraint 160 is rotatably coupled at a proximal end 162 for rotational movement about an axis of rotation 164. The axis of rotation 164 is fixedly positioned relative to the neutral position of the ramp portion 104. For ramp assemblies 100 having a fixed portion 102, such as the embodiment shown in FIGS. 4-7, the restraint 160 can be coupled to a fixed portion of the ramp assembly. Alternately, the restraint 160 can be coupled to a portion of the vehicle to which the ramp assembly 100 is mounted or to any other structure that maintains a fixed position relative to the neutral position of the ramp portion 104.

In the embodiment shown in FIG. 4, the restraint 160 has an elongate body extending along the side of the ramp assembly. The form and orientation of the illustrated elongate body are exemplary only, and should not be considered limiting. In this regard, various changes to the shape and configuration of the body are contemplated and should be considered within the scope of the present disclosure. An end stop 166 is disposed on the distal end 168 of the restraint 160, and a guide 170 is disposed on the proximal end 162 of the restraint. The end stop 166 and guide 170, are illustrated as being integral with the restraint 160, however alternate embodiments are possible wherein one or both of the end stop and guide are formed separately and then attached to the restraint.

The drive element 140 is slidably coupled to the restraint 160. More specifically, in the illustrated embodiment, the rod engages the end stop 166 and the guide 170 for sliding translation. The spring fitting 146 is located between the guide 170 and the end stop 166, and a compression spring 180 is disposed between the end stop and the spring fitting 146. In the illustrated embodiment, the drive element 140 (rod) is concentrically disposed within the compression spring 180.

When the proximal end 150 of the drive element 140 moves along the arcuate path in response to rotation of the crank 132, the restraint 160 rotates around the axis of rotation 162 about which the proximal end 162 of the restraint 160 is coupled. This motion changes the distance between the spring fitting 146 and the end stop 166. As shown in FIGS. 5-7, the distance between the spring fitting 146 and the end stop 166 is greatest when the ramp portion 104 is in the neutral position (FIG. 6). As the ramp portion 104 moves from the neutral position toward the stowed position (FIG. 5) or a deployed position (FIG. 7), the distance between the spring fitting 146 and the end stop 166 decreases, and the spring fitting compresses the compressing spring by moving a first end of the compression spring toward a second end of the compression spring.

As the ramp portion 104 reciprocates between the stowed position and a deployed position, the compression spring 180 engages the spring fitting 146 and the end stop 166. The compression spring 180 applies a force F to the spring fitting 146 that pushes the spring fitting 146, and therefore the drive element 140, away from the output shaft 116. Consequently, the drive element 140 pulls on the crank 132 with a force F. The force F creates a moment $M_F$ about the center of rotation of the ramp portion 104 that tends to rotate the ramp toward the neutral position. As the ramp portion moves away from the neutral position, the distance between the spring fitting 146 and the end stop 166 decreases, and the compression spring 180 is compressed. The compression of the spring 180 increases the force F applied to the crank 132, and thus the moment $M_F$, increases as the ramp portion 104 moves away from the neutral position. The moment $M_F$ acts on the output shaft 116 to counteract the moment $M_W$ that results from the weight W of the ramp portion 104 when the ramp portion 104 is in a position other than the neutral position. Thus, when the ramp portion 104 is between the neutral position and the stowed position, the compression spring 180 provides a force that biases the ramp portion toward a deployed position. Similarly, when the ramp portion 104 is between the neutral position and a deployed position, the spring 180 provides a force that biases the ramp portion toward the stowed position.

As shown in FIG. 6, when the ramp portion 104 is in the neutral position, the compression spring 180 is at maximum extension, and the force F imparted by spring acts through the center of rotation of the crank 132. As a result, the spring 180 does not impart any moment on the ramp portion 104 when the ramp portions in the neutral position.

The compression spring 180 is preferably sized such that as the ramp portion 104 reciprocates between the stowed position and a deployed position, compression of the compression spring 180 imparts a force F of a magnitude such that $M_F$ approximates $M_W$. In this regard, the compression spring 180 may have a constant stiffness or a variable stiffness. By minimizing the difference between $M_F$ and $M_W$, the output requirement on the motor is also reduced, allowing for a smaller, more compact motor. Manual operation effort is also reduced.

In the disclosed embodiment, the compression spring 180 engages both the end stop 166 and spring fitting 146 when the ramp portion 104 is in the neutral position. In this position, the compression spring 180 may be partially compressed. Because the force is applied through the center of rotation of the shaft 116, the force does not result in a moment M about the shaft. Alternately, the compression spring 180 may uncompressed when the ramp portion 104 is in the neutral position so that the compression spring 180 applies no moment M to the shaft 116 when the ramp portion 104 is in the neutral position.

Figure 8:
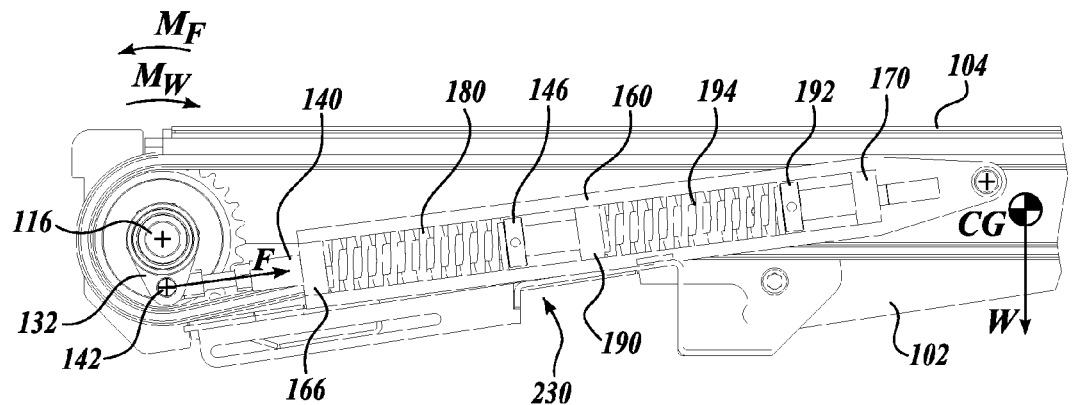
FIG. 8 shows a side view of a second exemplary embodiment of the counterbalance assembly of FIG. 1, with the ramp portion in the stowed position.
Figure 9:
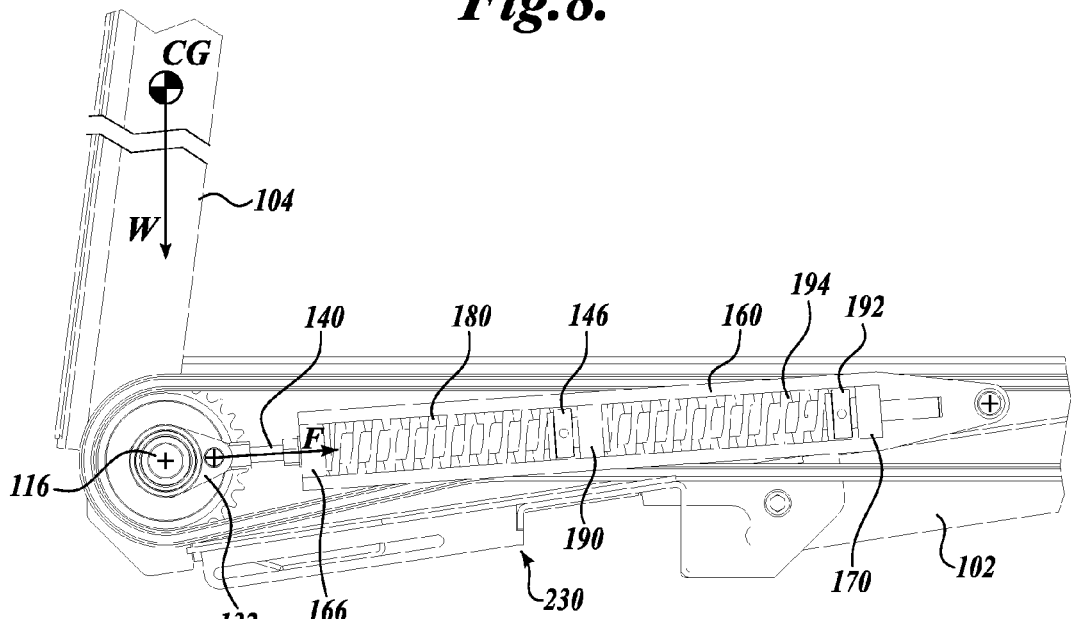
FIG. 9 shows a side view of the counterbalance assembly of FIG. 8, with the ramp portion in the neutral position.
Figure 10:
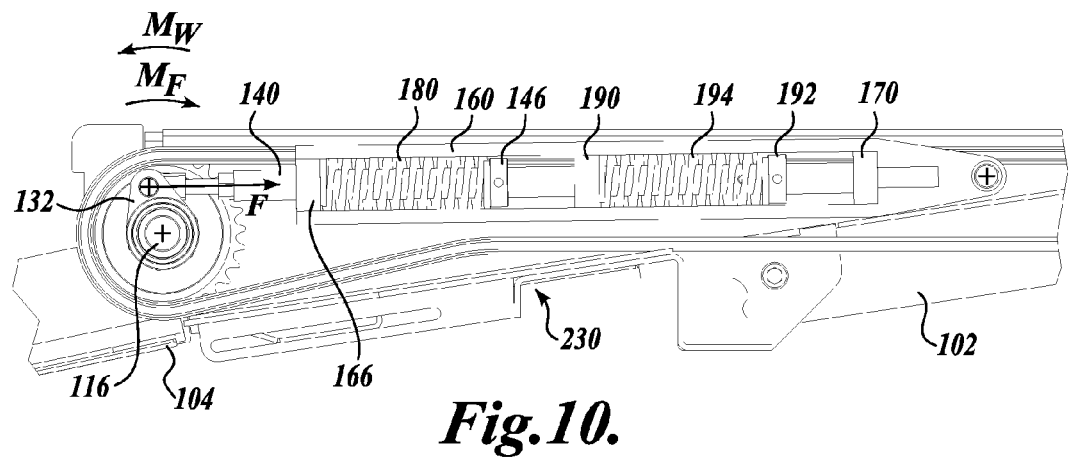
FIG. 10 shows a side view of the counterbalance assembly of FIG. 8, with the ramp portion in a deployed position.

FIGS. 8-10 show a second exemplary embodiment of a counterbalance assembly 230. The counterbalance assembly 230 is similar to the counterbalance assembly 130 of FIGS. 5-7, but includes two springs in series instead of a single spring to provide a counterbalancing force.

Like the previously described counterbalance assembly 130, the counterbalance assembly 230 shown in FIGS. 8-10 includes a crank 132 coupled to an output shaft 116 so that the crank rotates in a first direction when the ramp portion 104 moves toward the stowed position and in an second direction when the ramp portion moves toward a deployed position. A drive element 140 is rotatably coupled to the crank 132 about an axis of rotation 142 so that the axis of rotation moves along an arcuate path when the ramp portion 104 reciprocates between the stowed position and a deployed position. A first end stop 166 is associated with the proximal end of the drive element 140, and a guide is disposed on the distal end of the drive element.

The counterbalance assembly 230 further includes a restraint 160 coupled at a proximal end for rotation about an axis of rotation 164, wherein the axis of rotation maintains a fixed position relative to the neutral position of the ramp portion 104. A first spring fitting 146 is associated with, i.e., coupled to or integrally formed with, the restraint 160. The restraint 160 is slidably coupled to the drive element 140 so that movement of the ramp portion 104 away from the neutral direction toward either the stowed position or a deployed position decreases the distance between the first end stop 166 and the first spring fitting 146.

A first compression spring 180 is disposed between the first end stop 166 and the first spring fitting 146. Movement of the ramp portion 104 from the neutral position toward the stowed position and from the neutral position toward the deployed position moves a first end of the compression spring toward a second end of the compression spring, i.e., compresses the compression spring, so that the compression spring provides a force F that tends to move the ramp portion toward the neutral position.

The counterbalance 230 further includes a second end stop 190 associated with the restraint 160, a second spring fitting 192 associated with the drive element 140, and a second compression spring 194 disposed between the second end stop 190 and the second spring fitting 192. Similar to the first end stop 166 and first spring fitting 146, movement of the ramp portion 104 from the neutral position toward the stowed position and from the neutral position toward the deployed position moves the second spring fitting 192 toward the second end stop 190. The second spring fitting 192 engages a first end of the second compression spring 194 to move the first end toward a second end of the compression spring, i.e., to compress the compression spring, so that the spring provides a force F that tends to move the ramp portion toward the neutral position.

In the illustrated embodiment, the first and second compression springs 180 and 194, are arranged in parallel. The restraint 160 is a rod concentrically disposed within the first and second compression springs 180 and 194. Alternate configurations in which the springs are arranged in series are also contemplated.

The first and second compression springs 180 and 194 provide a counterbalancing force F that biases the ramp portion 104 toward the stowed position when the ramp portion is located between the neutral position and a deployed position, and toward a deployed position when the ramp portion is located between the neutral position and the stowed position. The force provided by a typical compression spring is proportional to the amount of compression, i.e., the change in length of the spring. Accordingly, the two springs combine to provide twice the force F as would be provided by a single spring with a similar spring constant. As a result, smaller springs can be utilized to provide the desired counterbalancing force F, allowing for a more compact counterbalance assembly 230.

Figure 11:
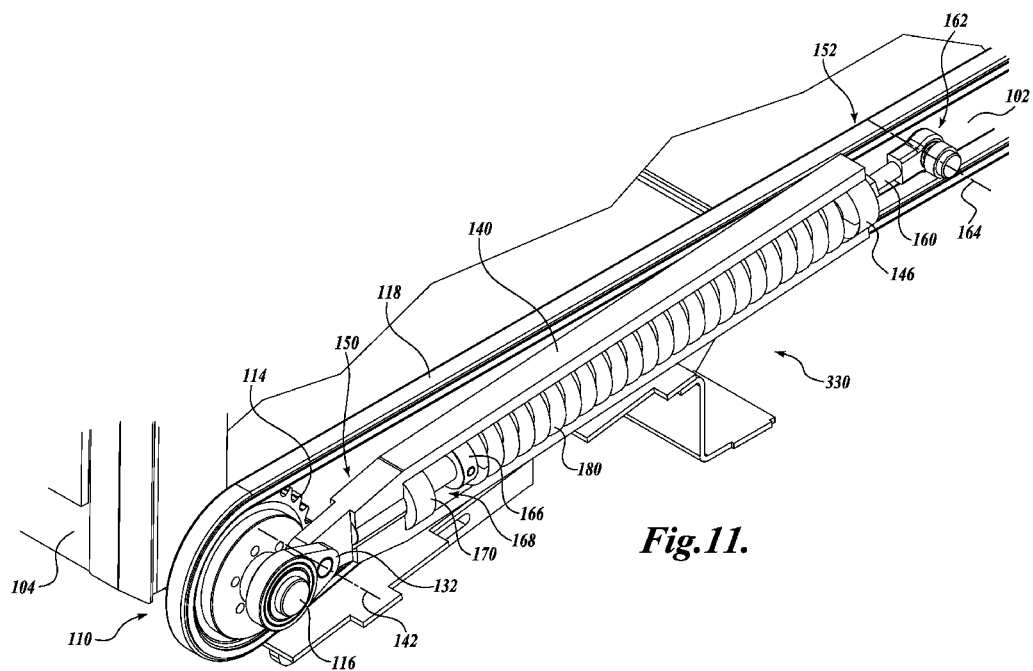
FIG. 11 shows an isometric view of a third exemplary embodiment of the counterbalance assembly of FIG. 1.

FIGS. 11-14 show a third exemplary embodiment of a counterbalance assembly 330. Referring to FIG. 11, the counterbalance assembly 330 is similar to the counterbalance assembly 130 shown in FIG. 4, but with the elements of the counterbalance generally reversed. Thus, the drive element 140 (illustrated as an elongate body similar to the restraint member 160 of counterbalance assembly 130) is rotatably coupled at a proximal end 150 to the crank 132 about an axis of rotation 142. A guide 170 is located on the proximal end 150 of the drive element 140, and a spring fitting 146 for engaging a first end of a compression spring 180 is located on the distal end 152 of the drive element. The restraint member 160 (a rod similar to the drive element 140 of counterbalance assembly 130) is coupled at a proximal end 162 for rotatable movement about an axis of rotation 164 that has a fixed position relative to the neutral position of the ramp portion 104. The rod is concentrically disposed within the compression spring 180, and an end stop 166 is disposed on the distal end of the rod to engage a second end of the compression spring 180.

The drive element 140 is slidably coupled to the restraint 160 so that movement of the ramp portion 104 from the neutral position (FIG. 13) toward the stowed position (FIG. 12) or toward a deployed position (FIG. 14) moves the first end of the compression spring 180 toward the second end of the compression spring. Compression of the spring 180 in this manner produces a force that tends to bias the ramp portion 104 toward the neutral position.

Figure 12:
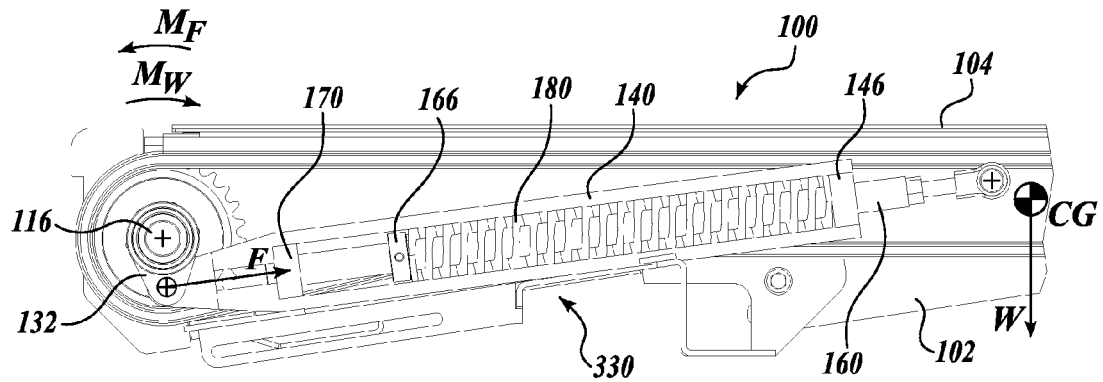
FIG. 12 shows a side view of the counterbalance assembly of FIG. 11, with the ramp portion in the stowed position.
Figure 13:
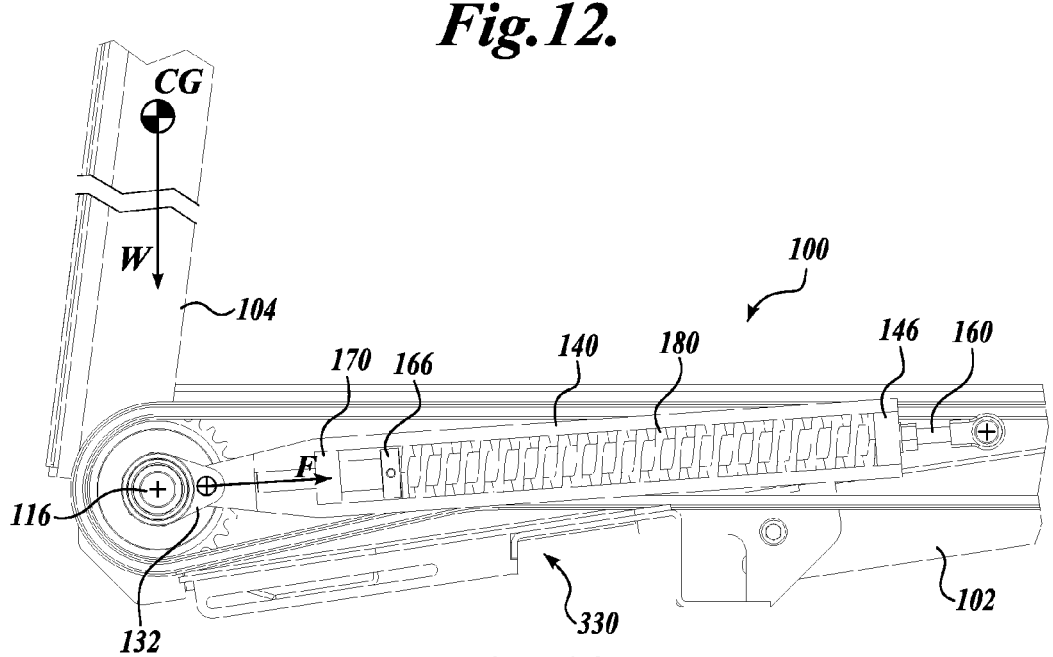
FIG. 13 shows a side view of the counterbalance assembly of FIG. 11, with the ramp portion in the neutral position.
Figure 14:
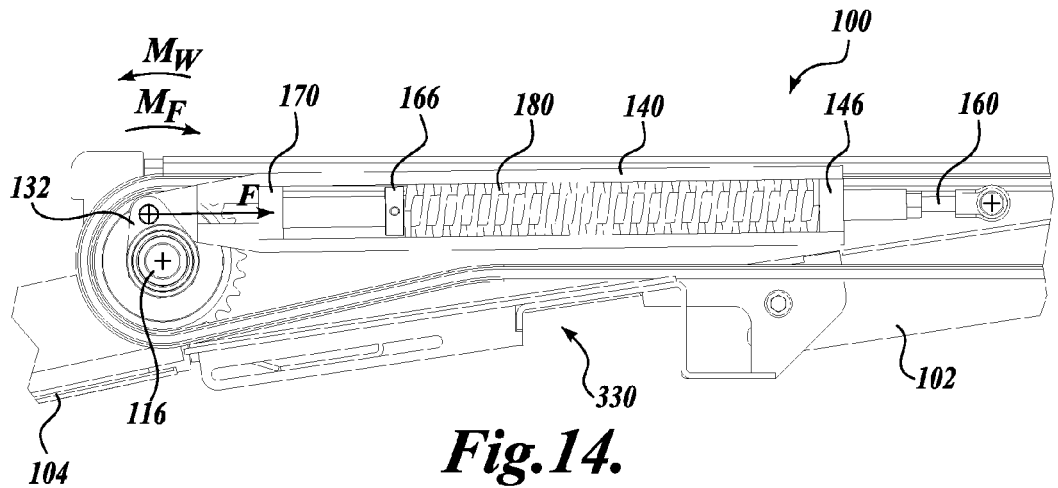
FIG. 14 shows a side view of the counterbalance assembly of FIG. 11, with the ramp portion in a deployed position.
Figure 15:
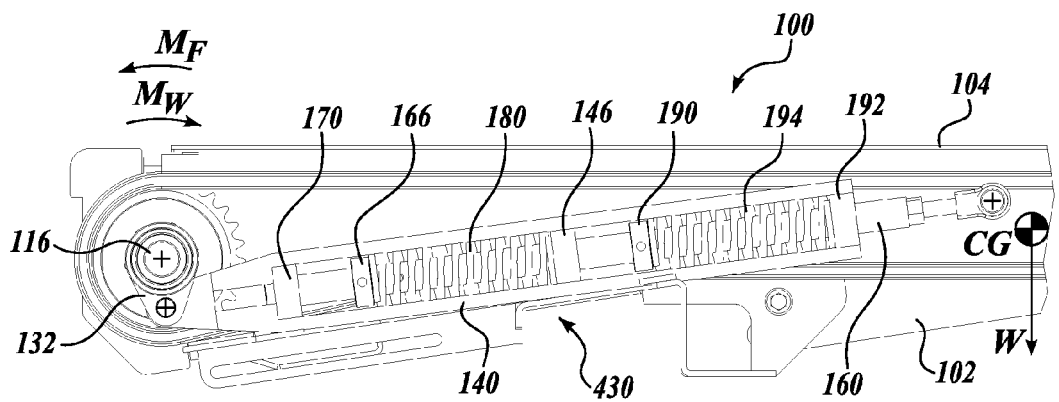
FIG. 15 shows a side view of a fourth exemplary embodiment of the counterbalance assembly of FIG. 1, with the ramp portion in the stowed position.
Figure 16:
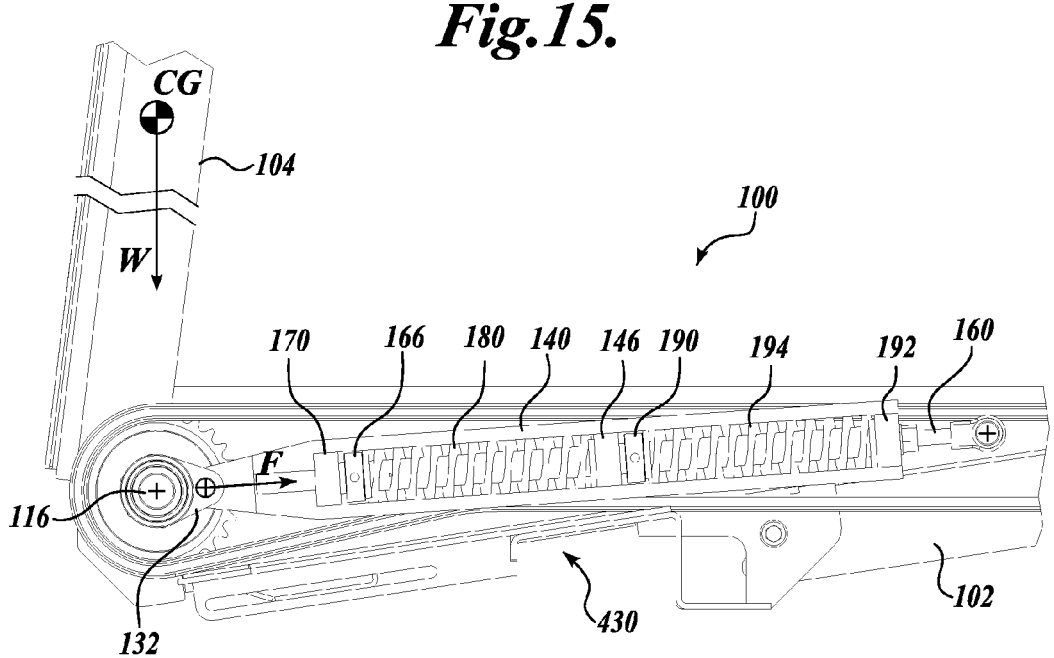
FIG. 16 shows a side view of the counterbalance assembly of FIG. 15, with the ramp portion in the neutral position.
Figure 17:
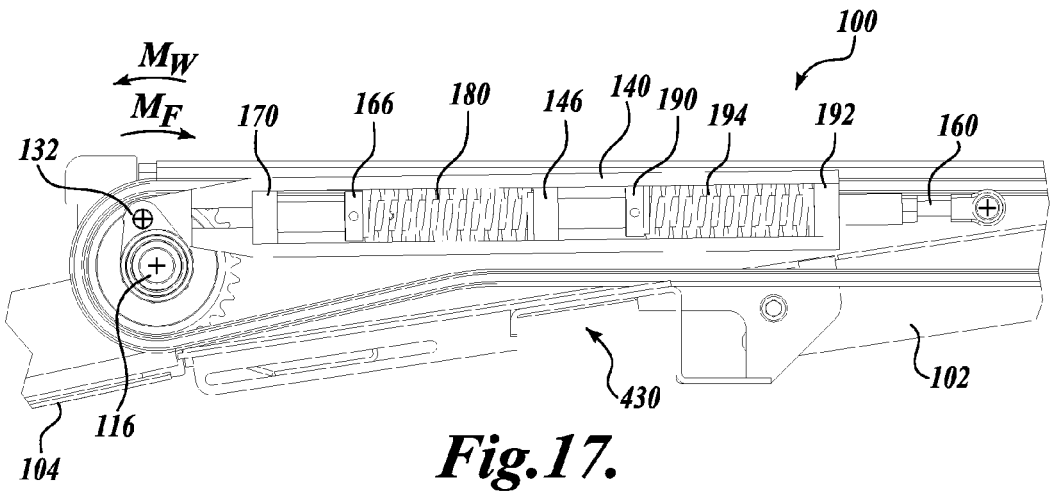
FIG. 17 shows a side view of the counterbalance assembly of FIG. 15, with the ramp portion in a deployed position.

FIGS. 15-17 show a fourth embodiment of a counterbalance assembly 430 similar to the counterbalance assembly 330 shown in FIGS. 12-14, but with a second spring to provide additional force to counterbalance the weight of the ramp portion 104. In addition to the structure described with respect to counterbalance assembly 330, counterbalance 430 further includes a second end stop 190 associated with the restraint 160, a second spring fitting 192 associated with the drive element 140, and a second compression spring 194 disposed therebetween. In the illustrated embodiment, the restraint 160 is a rod concentrically disposed within the first and second compression springs 180 and 194. Movement of the ramp portion from the neutral position (FIG. 16) toward either the stowed position (FIG. 15) or a deployed position (FIG. 17) compresses the second compression spring 194. The combined force F resulting from the compression of the first and second compression springs 180 and 194 biases the ramp toward the neutral position, thus reducing or eliminating the force required from the motor to counteract the weight of the ramp portion.

Figure 18:
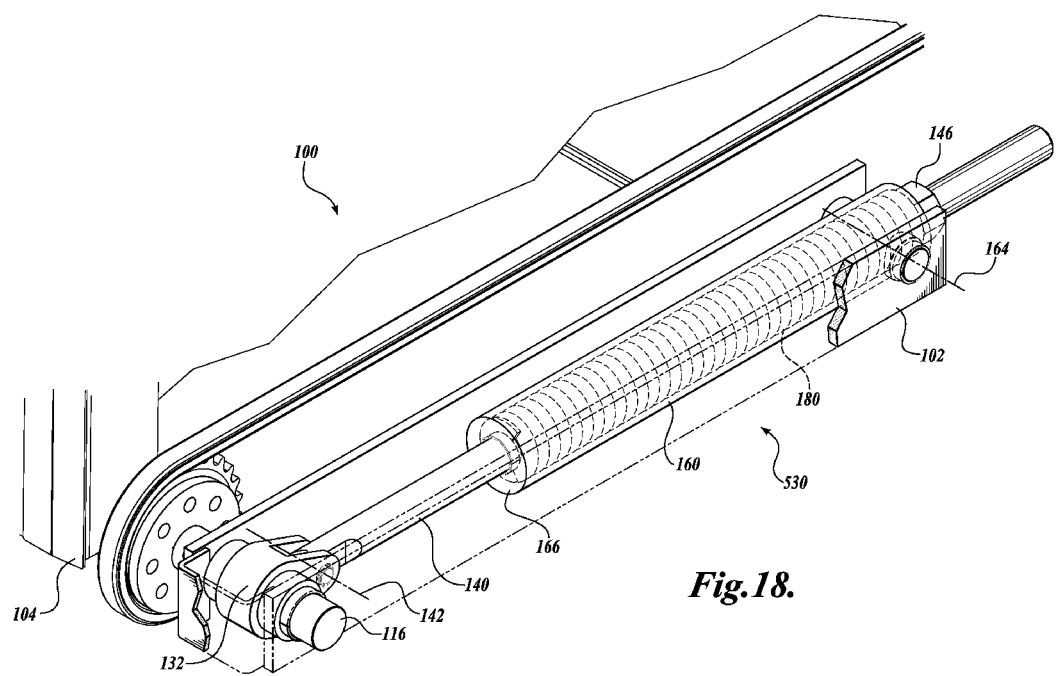
FIG. 18 shows an isometric view of a fifth exemplary embodiment of the counterbalance assembly of FIG. 1.
Figure 19:
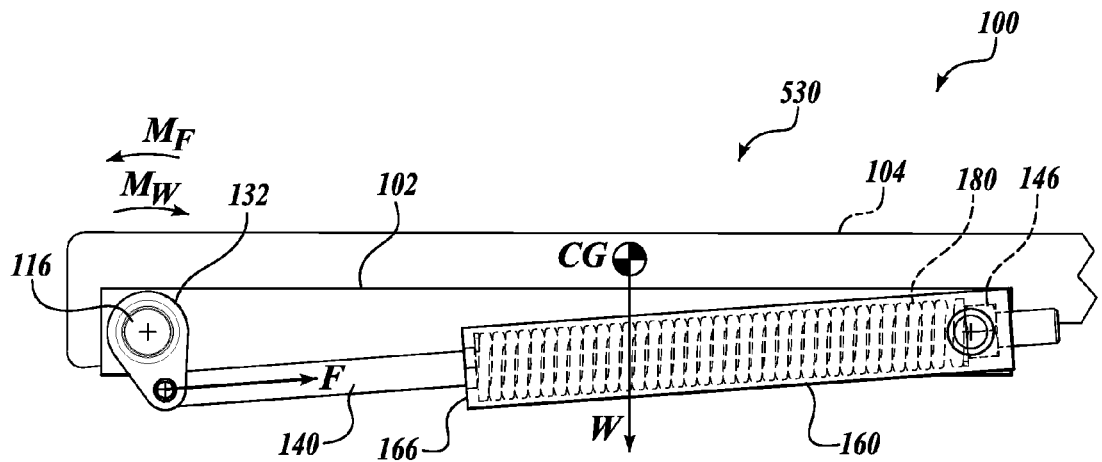
FIG. 19 shows a side view of the counterbalance assembly of FIG. 18, with the ramp portion in the stowed position.
Figure 20:
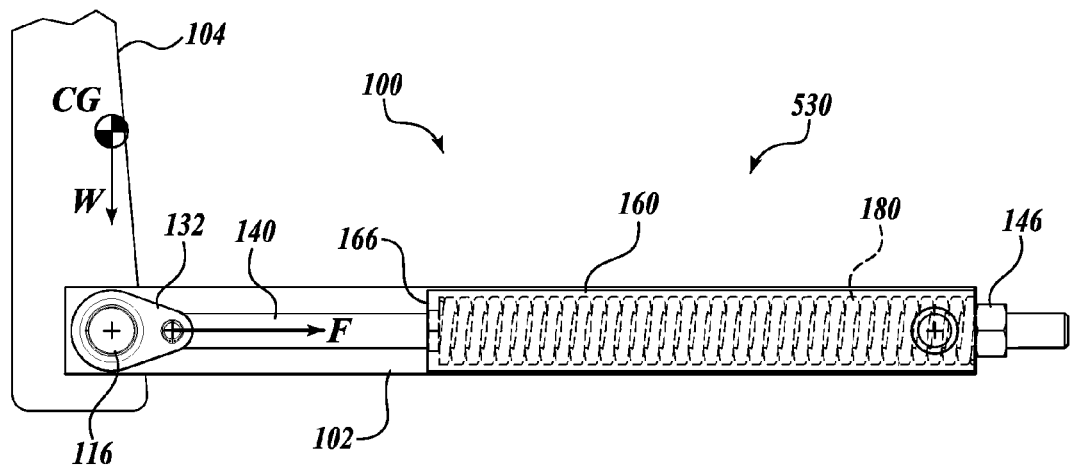
FIG. 20 shows a side view of the counterbalance assembly of FIG. 18, with the ramp portion in the neutral position.
Figure 21:
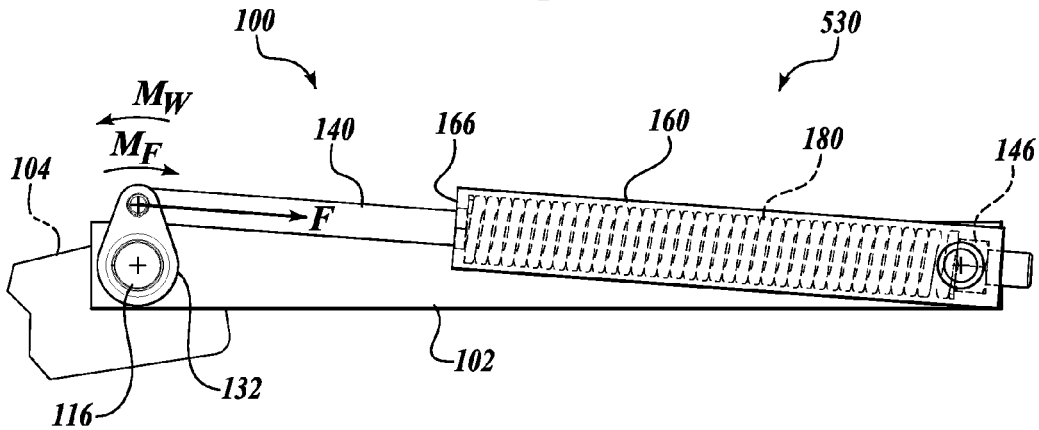
FIG. 21 shows a side view of the counterbalance assembly of FIG. 18, with the ramp portion in a deployed position.

FIGS. 18-21 show a fifth exemplary embodiment of a counterbalance assembly 530. The counterbalance assembly 530 is similar to the counterbalance assembly 130 disclosed in FIGS. 4-7, except that the restraint 160 is a hollow cylindrical sleeve coupled at a proximal end for rotating movement about an axis of rotation 164, wherein the axis of rotation has a fixed position relative to the neutral position of the ramp portion 104. As best shown in FIG. 18, the sleeve includes a shoulder at the distal end that functions as an end stop 166.

In the illustrated embodiment, the drive element 140 is a rod extending through the central portion of the restraint 160. A nut is threadedly coupled to the distal end of the rod to act as a spring fitting 146. A compression spring 180 is at least partially disposed within the sleeve so that the rod is concentrically disposed within the spring, and the spring fitting 146 and end stop 166 engage first and second ends, respectively, of the spring. The position of the nut is selectively adjustable to provide a predetermined amount of preload or no preload at all when the ramp portion 104 is in the neutral position.

Similar to the previously described embodiments, the compression spring 180 provides a force F that counteracts the weight of the ramp. When the ramp portion 104 moves from the neutral position (FIG. 20) toward the stowed position (FIG. 19) or a deployed position (FIG. 21), the spring fitting 146 moves the first end of the compression spring 180 toward the second end of the compression spring, which is restrained by the shoulder (end stop 166). The force provided by the spring 180 is proportional to the amount by which the spring is compressed. By selecting a compression spring 180 with a suitable spring constant and adjusting the preload in the spring, the force F provided by the spring can be optimized so the moment $M_F$ imparted by the force closely matches the moment $M_W$ resulting from the weight of the ramp portion 104.

While illustrative embodiments have been illustrated and described, it will be appreciated that various changes can be made therein without departing from the spirit and scope of the invention.

The embodiments of the invention in which an exclusive property or privilege is claimed are defined as follows:

1. A ramp assembly, comprising:
   (a) a ramp portion configured for reciprocating motion between a stowed position, a deployed position, and a neutral position; and
   (b) a counterbalance associated with the ramp portion, comprising:
      (i) a drive element comprising a spring fitting, wherein the drive element is rotatably coupled about a first axis of rotation, the first axis of rotation moving along an arcuate path when the ramp portion reciprocates between the stowed position and the deployed position;
      (ii) a restraint slidably coupled to the drive element and coupled for rotational movement about a second axis of rotation, wherein the second axis of rotation has a fixed location relative to the neutral position of the ramp portion; and
      (iii) a compression spring disposed between the spring fitting and a portion of the restraint, wherein the compression spring provides a force to bias the ramp portion (1) toward the stowed position when the ramp portion is between the deployed position and the neutral position, and (2) toward the deployed position when the ramp portion is between the stowed position and the neutral position.

2. The ramp assembly of claim 1, wherein the spring fitting engages a first end of the compression spring to move the first end of the compression spring toward a second end of the compression spring when the ramp portion moves from the neutral position toward the stowed position.

3. The ramp assembly of claim 2, wherein the spring fitting engages the first end of the compression spring to move the first end of the compression spring toward the second end of the compression spring when the ramp portion moves from the neutral position toward the deployed position.

4. The ramp assembly of claim 1, wherein the force provided by the compression spring does not bias the ramp portion when the ramp portion is in the neutral position.

5. The ramp assembly of claim 1, further comprising a crank associated with the ramp portion to rotate (1) in a first direction when the ramp portion moves toward the stowed position, and (2) in a second direction opposite the first direction when the ramp portion moves toward the deployed position, wherein the drive element is rotatably coupled to the crank about the first axis of rotation.

6. The ramp assembly of claim 1, wherein the drive element is a rod concentrically disposed within the compression spring.

7. The ramp assembly of claim 1, wherein the restraint is a rod concentrically disposed within the compression spring.

8. The ramp assembly of claim 1, wherein the drive element further comprises a second spring fitting, and wherein the restraint comprises first and second end stops, the counterbalance further comprising a second compression spring disposed between the second compression spring fitting and the second end stop, wherein the second compression spring provides a force to bias the ramp portion (1) toward the stowed position when the ramp portion is between the deployed position and the neutral position, and (2) toward the deployed position when the ramp portion is between the stowed position and the neutral position.

9. The ramp assembly of claim 8, wherein the drive element is a rod concentrically disposed within the first and second compression springs.

10. The ramp assembly of claim 8, wherein the restraint is a rod concentrically disposed within the first and second compression springs.

* * * * *